No. 672,780. Patented Apr. 23, 1901.
K. KELLERMANN.
RASP.
(Application filed Jan. 7, 1901.)
(No Model.)
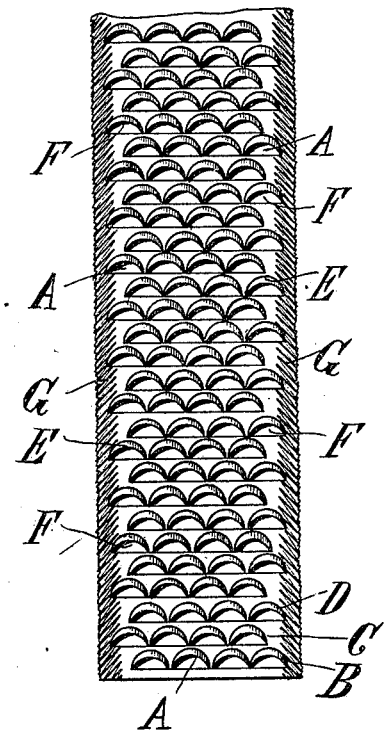
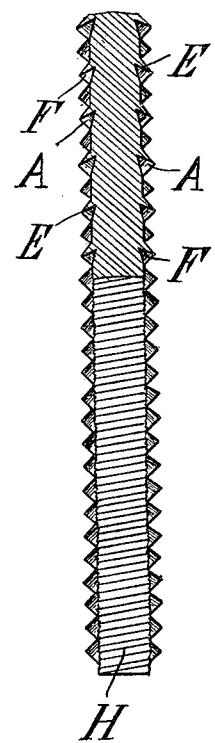
Witnesses:
Inventor:
Karl Kellermann
by Wm H Babcock, Atty.

UNITED STATES PATENT OFFICE.

KARL KELLERMANN, OF RONSDORF, GERMANY.

RASP.

SPECIFICATION forming part of Letters Patent No. 672,780, dated April 23, 1901.

Application filed January 7, 1901. Serial No. 42,406. (No model.)

*To all whom it may concern:*

Be it known that I, KARL KELLERMANN, a citizen of the German Empire, residing at Ronsdorf, near Barmen, in the Province of Rhenish Prussia, Kingdom of Prussia, Germany, have invented certain new and useful Improvements in Rasps; and I do hereby declare the following to be a full, clear, and exact description of the invention, such as will enable others skilled in the art to which it appertains to make and use the same.

My invention relates to a new rasp for working wood, horn, hoof, and such like materials, and it is especially adapted as a farrier's rasp. From the rasps hitherto in use it distinguishes itself by the shape of the teeth or by the cut. Whereas in the rasps now in use the indentations and the projections formed are small and comparatively irregular, forming, so to say, an irregular but close roughing of the surface, I make my new rasp with comparatively large teeth, each in the shape of a little vault of distinct arch shape or of half-circular form; and my object is to get a better cutting action and self-cleaning of the teeth from the chips or filings. I attain this object by the rasp shown on the accompanying drawings, in which—

Figure 1 is a view of part of a rasp in plan in full size. Fig. 2 is a side view of Fig. 1, partly in section.

As will be seen from Fig. 1, the cut or the teeth consist of large regular indentations A, cut in straight rows B C D across the width of the body of the rasp, each following row being set by half the width of a tooth to the right or left of the preceding one. These indentations are made by means of a chisel or cutting-tool of half-round form at its cutting edge and which is set obliquely upon the piece of steel or blank in such a manner that when a blow is applied to it it will make an impression into the soft steel, and thereby raise part of the metal in such a manner that this raised part (the tooth E) forms the arch over the vault or cavity F below it, presenting at its raised free edge a half-round arch-like cutting edge, acting like a jack-plane, while the part behind this cutting edge slopes down obliquely at the outer side to the surface of the body of the rasp. The hollow part underneath the tooth forms a sort of a pocket, which in consequence of its round form in lateral direction and wedge shape allows easy cleaning and self-removal of chips and filings out of the pockets. At the sides right and left of the surfaces containing the new cut I make an ordinary rough single cut G and the same also at the side edges H, as shown by Fig. 2.

What I claim as my invention is—

As a new article of manufacture a rasp distinguished by a specially-shaped cut consisting of rows of teeth of vault or arch form, each tooth presenting a nearly half-circular cutting edge and a wedge-shaped hollow space below it, the rows following each other being alternately set to the right or left by half the width of a tooth, while along the sides and on the side edges an ordinary rough single cut, G and H respectively are applied, the whole as described and illustrated and for the purpose set forth.

In testimony whereof I have affixed my signature in presence of two witnesses.

KARL KELLERMANN.

Witnesses:
   OTTO KÖNIG,
   J. A. RITTERSHAUS.